Figure 1:
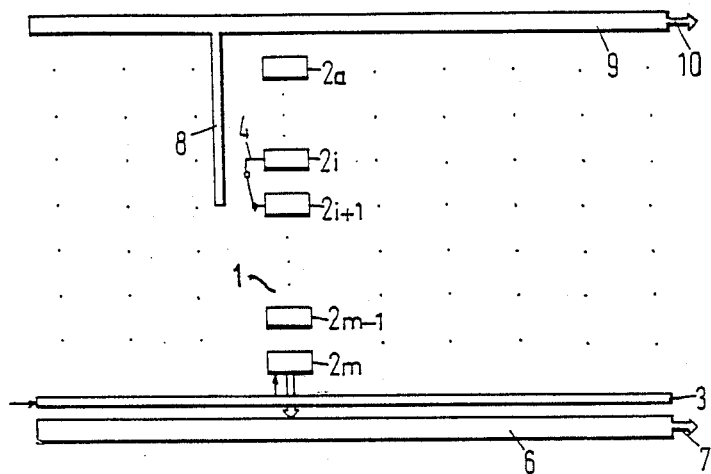

United States Patent [19]

Beerlage

[11] Patent Number: 4,950,906
[45] Date of Patent: Aug. 21, 1990

[54] IMAGE PICKUP DEVICE

[75] Inventor: Meindert J. M. Beerlage, MX Pijnacker, Netherlands

[73] Assignee: B.V. Optische Industrie "De Oude Delft", Delft, Netherlands

[21] Appl. No.: 108,083

[22] Filed: Oct. 13, 1987

[30] Foreign Application Priority Data

Oct. 17, 1986 [NL] Netherlands ............ 8602615

[51] Int. Cl.$^5$ ............................ H01L 27/146
[52] U.S. Cl. ................ 250/370.08; 250/370.01; 250/370.09
[58] Field of Search ........... 250/338.4, 370.01, 370.09, 250/370.08, 332, 370.10; 357/32

[56] References Cited

U.S. PATENT DOCUMENTS

| | | |
|---|---|---|
| 3,869,572 | 3/1975 | Carter .................... 357/32 |
| 3,934,143 | 1/1976 | Prag ................... 250/370.1 |
| 4,179,100 | 12/1979 | Sashin et al. ............ 378/22 |
| 4,259,576 | 3/1981 | Gridley et al. ........ 250/370.08 |
| 4,383,327 | 5/1983 | Kruger .................... 378/22 |
| 4,423,325 | 12/1983 | Foss ..................... 250/332 |

FOREIGN PATENT DOCUMENTS 0159758 10/1985 European Pat. Off. ........ 357/32

Primary Examiner—Constantine Hannaher
Attorney, Agent, or Firm—Louis E. Marn

[57] ABSTRACT

An image pickup device comprises a matrix of rows and columns of image pickup elements. Image information is transferred in the column direction in the time-delay-and-integration mode. Each column comprises at least two regions containing image pickup elements, whereby spectrally different images can be picked up during a single scan.

8 Claims, 1 Drawing Sheet

IMAGE PICKUP DEVICE

The invention relates to an image pickup device comprising a matrix having horizontal rows and vertical columns of image pickup elements, means for supplying clock signals to the matrix of image pickup elements for transferring image information in the column direction in the time-delay-and-integration mode, and means for continuously reading image information out of a column.

In radiography the directing of a flat fan-shaped beam of x-ray radiation via a body under examination to an image pickup device consisting of a large number of image pickup elements situated in one line is known from the U.S. Pat. No. 4,179,100. In this case each image pickup element receives, optionally after further processing, the radiation which has been transmitted through a corresponding part of the body under examination. As further processing it is possible for the radiation to be converted into visible light in an x-ray detector, for example, before it is picked up by the image pickup device. In the case of an image pickup device consisting of a large number of image pickup elements situated in one line and having, for example, dimensions of 0.1×0.1 mm, the exposure time for each image pickup element is extremely short for the usual scanning speeds of a body under examination. As a result, the signal/noise ratio of the image obtained is very poor or the source loading has to be raised to undesirably high levels to achieve a better signal/noise ratio. In order, nevertheless, to obtain an acceptable signal/noise ratio for a relatively low source loading, it is necessary to use the x-ray source more efficiently than is possible with a fan-shaped beam which has only a thickness of the size of one image pickup element.

Making use of an image pickup device comprising a matrix having rows and columns of image pickup elements, the charge of which is formed during a certain period in a certain pickup element as a result of the radiation received by said element during said period, being transferred during a reading period to an adjacent associated vertical shift register, is known from the U.S. Pat. No. 4,383,327. This takes place during the reading period for all the image pickup elements in each row. A relative movement between the body and the image pickup device is also brought about between the consecutive periods so that the same part of the body under examination is imaged on the next row of image pickup elements during the subsequent period. It is also possible in a manner known per se to combine the function of converting radiation into charge and the function of transferring charge in a vertical CCD shift register. The charge in the shift register tracks so that in this manner, during consecutive periods, a charge is accumulated by consecutive image pickup elements in a column in the associated shift register. The accumulated charge is the sum of the charge which is transmitted through a specific part (an image point) of the body under examination during the consecutive periods.

This method of scanning is termed TDI (time delay and integration) and appears to be particularly well suited for use in the examination of bodies by means of x-ray radiation, it being possible for a usable image to be formed in spite of the fact that each image pickup element per se generates only a very small quantity of charge in response to the radiation received. For a comprehensive discussion of the TDI principle, reference is made to the U.S. Pat. No. 4,383,327.

Generating so-called dual-energy x-ray images by alternately applying two different high-voltage values, for example 70 $kV_p$ and 130 $kV_p$ to an x-ray radiation source, the respective high-voltage values generating x-ray spectra with different energy centre points, often termed a different hardness, is known from the article entitled "Computerized dual-energy imaging: a technical description" by J. Coumans et al. in Medicamundi, Vol. 27, no. 3, 1982. By irradiating a body under examination successively with x-ray radiation having a first energy centre point and then with x-ray radiation having a second energy centre point, it is possible to process the x-ray images obtained, for example, by means of a computer, so that, for example, if a human body is irradiated, bones are not imaged and tissue is, as a result of which it is possible to image tissue parts situated behind, for example, ribs, considerably more clearly. All this is based on the fact that different materials in, for example, the human body, have a different absorption for x-ray radiation having a different hardness.

In addition to obtaining different x-ray radiation energies by means of switching the supply voltage of the x-ray radiation source, it is also possible to obtain from an x-ray radiation source driven with one single supply voltage different radiation energies by partially filtering the x-ray radiation beam radiated by the source before it reaches the body to be irradiated. As a result of this, a beam of x-ray radiation is obtained which in fact consists of a first and a second sub-beam having respectively a first and a second x-ray radiation energy. In this case, the filtered beam consists essentially of hard x-ray radiation because the soft radiation in a beam can be intercepted with a filter while the unfiltered beam contains hard and soft radiation.

The object of the invention is to make an image pickup device which operates according to the above-described TDI principle suitable for processing x-ray images which are obtained by means of two x-ray radiation energies.

For this purpose the invention provides an image pickup device of the abovementioned type in which each column of image pickup elements comprises at least two regions containing image pickup elements and in which the readout means for each region comprise readout means which are coupled so as to read out the image information from the associated region.

According to a first embodiment, the regions of each column of image pickup elements may be situated in line with each other in the column direction.

According to a second exemplary embodiment, the image pickup elements of a first region extend over the entire length of the column and the image pickup elements of each subsequent region extend only over a section of the length of the column which is always smaller.

Although the invention is particularly suitable for simultaneously processing two x-ray images obtained with different x-ray radiation energies, attention is emphatically drawn to the fact that the invention is certainly not restricted to use in radiography. The invention is capable of being used in all those cases in which images are obtained alternately with different spectral regions and are scanned in the TDI mode. In this connection, said different spectral regions may be situated in the region of the x-ray radiation, but also in the region of visible or infra-red light. The separation into different spectral regions may in these cases also take place in the region of visible or infra-red light, for example, by means of filtering. At the same time, it is also possible to split up the radiation into more than two spectral regions, for example, visible light into red, blue and green light.

Figure 2:
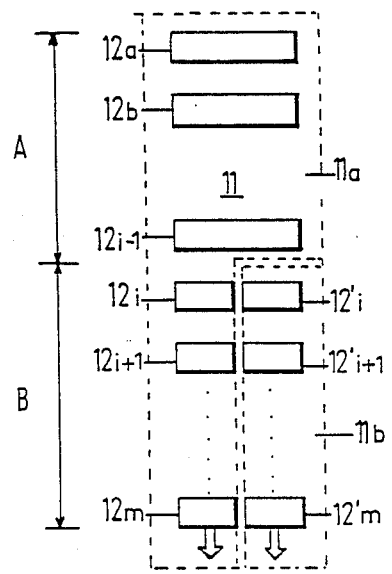

The invention will be explained in more detail below on the basis of two exemplary embodiments with reference to the drawing, wherein:

FIG. 1 shows a diagrammatic plan view of a single TDI column of an image pickup device which, according to a first exemplary embodiment of the invention, is suitable for detecting two different x-ray radiation energies; and FIG. 2 shows a diagrammatic plan view of a single TDI column of an image pickup device which, according to a second exemplary embodiment of the invention, is suitable for detecting two different x-ray radiation energies.

FIG. 1 shows a single column 1 consisting of m image pickup elements $2a-2m$. A complete image pickup device operating according to the TDI principle comprises a large number, for example, n, of such columns next to each other so that the complete image pickup device consists of a matrix of m×n image pickup elements. A bus 3 is provided for supplying clock signals to each column and to each image pickup element of the image pickup device in order to transfer the image information from an image point of a body to be irradiated by means of x-ray radiation in the column direction in the known manner in the TDI mode from image pickup element $2a$ to image pickup element $2m$.

Each of the columns, such as column 1, can be constructed in a manner such that each image pickup element in the column performs the function of converting from light into charge and the function of transferring the charge in the column direction under control of the clock signals using known CCD techniques. It is, however, also possible to arrange for each image pickup element to perform exclusively the conversion of light into charge, while next to each column of image pickup elements there is provided a vertical CCD shift register which continuously receives the charge from an adjacent image pickup element in order to transfer it stepwise in the column direction so that in this way, to the charge which is representative of one particular image point of the body to be irradiated, it is possible to add the charge from said one image point from the subsequent image pickup element in each case during each transfer step.

The x-ray radiation source which is not shown and which works in conjunction with the image pickup device according to FIG. 1 is designed in a manner such that it radiates two flat x-ray radiation beams, of which the one beam consists of relatively hard, filtered radiation and the other of combined hard and soft radiation, such as is described, for example, in the Dutch Patent Application 8,401,946. In this case, the image pickup device is positioned with respect to the two beams so that the light which is generated under the influence of the soft radiation always reaches the image pickup elements $2_a \ldots 2_i$ (i<m) and the light which originates from the combined radiation reaches the image pickup elements $2_{i+1} \ldots 2_m$, where, for example, i=m/2.

At the position of the image pickup element $2_i$ in the column 1, a switch, for example, a MOSFET, is provided which is indicated only diagrammatically with reference numeral 4 and can be controlled by means of clock signals. In a first position of said switch, the charge is transferred according to the usual TDI mode from image pickup element $2_a$ to image pickup element $2_m$ and can be read out of pickup element $2_m$ by a horizontal shift register 6 which is designed to read out the charge of the last image pickup element of each column and to transfer it to an output bus 7, where the image information from the image points of a body to be irradiated is therefore delivered in rows, i.e. representative of a linear part of the body. In this first position of switch 4 it is obviously not possible to distinguish between the image information originating from the hard or from the combined x-ray radiation energy.

If, however, switch 4 is in the second position, no charge transfer is possible from image pickup element $2_i$ to image pickup element $2_{i+1}$. Switch 4 is, however, connected in such a manner that the charge from the image pickup element $2_i$ is then transferred to a conduction channel 8 which is formed in the semiconductor substrate containing the image pickup device and which transfers the image information from the image pickup element $2_i$ to a second horizontal shift register 9 having an output terminal 10. The information from the image pickup elements $2_a \ldots 2_i$ is representative of the quantity of hard x-ray-radiation transmitted through an image point of the body to be irradiated. The shift register 9 is able to read out said information from each of the image pickup elements $2_i$ of the columns $1a-1n$ and deliver it successively to an output terminal 10 in the usual manner.

In the second position of switch 4, the image pickup elements $2_{i+1} \ldots 2_m$ receive exclusively the light formed by the combined x-ray radiation so that the shift register 6 now receives, from image pickup element $2_m$, image information from the image pickup elements $2_{i+1} \ldots 2_m$ which is representative of the quantity of combined radiation transmitted by the image point of the body to be irradiated.

By combining the output signals from the shift registers 6 and 9 optionally on the semiconductor substrate, the image information of the hard x-ray radiation and that of the soft x-ray radiation can be separated from each other by a simple subtraction operation so that they can be processed further.

In order to compensate for any difference in sensitivity of the image pickup elements for hard and combined x-ray radiation, or in order otherwise to introduce a scale factor, the position of the switch 4 can be chosen at an arbitrary position along the column 1 so that it is therefore not necessary that i=m/2. It is also possible to provide a number of switches 4 for a number of image pickup elements of the column 1, it being possible, if desired, for one of said switches to be set in the second position in order to cause a first column section to detect a first x-ray radiation energy and a second column section to detect a second x-ray radiation energy. In this case, a conduction channel 8 is of course provided which can receive the charge from each of the image pickup elements to which a switch 4 is added.

Instead of placing the shift register 6 at one end and the shift register 9 at the other end of the column, it is possible to place both shift registers 6 and 9 at one end of a column.

FIG. 2 shows diagrammatically a plan view of a second exemplary embodiment in which, for the sake of simplicity, only the surface of a single TDI column 11 of an image pickup device is shown, while the associated shift registers and the clock signal bus have also been omitted because the processing of the image information obtained with the structure according to FIG. 2 can take place in the same manner as with the structure according to FIG. 1.

The column 11 contains a region 11a containing image pickup elements $12_a$–$12_m$ and a region 11b containing image pickup elements $12'_i$–$12'_m$, where i<m. In this embodiment, too, the x-ray radiation source is designed in such a manner and positioned with respect to the column 11 that one section of the column, for example the section indicated in FIG. 2 by A, receives combined, i.e. hard and soft x-ray radiation and the region which is indicated by B receives only filtered, hard x-ray radiation. The image pickup elements $12_a$–$12_i$ in the section A of the region 11a of column 11 extend in this case over a larger width than the image pickup elements in respectively the region 11a and the region 11b in the section B.

The image pickup element $12_m$ of the column region 11a now delivers a charge which is representative of the sum of the light generated by the combined x-ray radiation which has been received by the image pickup elements $12_a$–$12_i$ and the light generated by the hard x-ray radiation which has been received by the image pickup elements $12_i$–$12_m$. The image pickup element $12'_m$ of the column region 11b delivers a charge which is representative of the light generated by the hard x-ray radiation which has been received by the image pickup elements $12'_i$–$12'_m$.

If, as in FIG. 2, the surface of the region 11a is three times as great as that of 11b and the surface of region 11b is chosen as a unit, image pickup element $12_b$ delivers a charge which contains three times the information resulting from hard x-ray radiation and twice the information resulting from soft x-ray radiation and the image pickup element $12'_m$ delivers a charge which contains one times the information resulting from hard x-ray radiation. The information from respectively the image pickup elements $12_m$ and $12'_m$ can be processed in the same manner as in the embodiment according to FIG. 1, optionally on the chip which contains the image pickup device. The advantage of the embodiment according to FIG. 2 is that no separate conduction channel is necessary in the chip for transferring the charge from a column section to a shift register, nor is a switch necessary for it to be possible to connect an image pickup element with said conductor.

Although the regions 11a and 11b of column 11 in FIG. 2 have an area ration of 3:1, it is, of course, also possible to choose said ratios differently provided all this is so constructed that one of the two regions receives only one particular x-ray radiation energy and that the other region receives both x-ray radiation energies.

I claim:

1. Image pickup device, which comprises a matrix having horizontal rows and vertical columns of image pickup element, means for supplying clock signals to said matrix of image pickup elements for transferring image information in a column direction in a time-delay-and-integration mode, means for continuously reading image information out of a column, each column of image pickup elements comprising at least two regions containing image pickup elements and readout means for each region coupled to read out image information from an associated region.

2. Image pickup device according to claim 1 wherein regions of each column are situated in line with each other in column direction.

3. Image pickup device according to claim 2 and further including switching means for a single image pickup element in said column and a conduction channel on one hand coupled via said switching means with said image pickup element and on another hand connected to a first readout means, said switching means blocking in one position charge transfer in said column direction at said position of said image pickup element.

4. Image pickup device according to claim 3 wherein said switching means permits transfer of charge in said column direction at said position of said image pickup elements to associated conduction channel.

5. Image pickup device according to claim 3 or 4 wherein each region includes a number of switching means for a certain image pickup element in a number of image pickup elements of a region of a column, said switching means in one position transferring charge from associated image pickup element to a conduction channel and one is in said one position during operation while other switching means are in another position.

6. Image pickup device according to claim 1 wherein image pickup elements of a first region extend over an entire length of said column and image pickup elements of each subsequent region extend over a smaller section of a length of a column.

7. Image pickup device according to claim 6 wherein last image pickup elements of regions, viewed in a transfer direction, are situated in a line near associated readout means.

8. Image pickup device according to claim 6 or 7 wherein image pickup elements of a region over a section of column length have a greater width than a remaining section of said column.

* * * * *

UNITED STATES PATENT AND TRADEMARK OFFICE
CERTIFICATE OF CORRECTION

PATENT NO. : 4,950,906
DATED : AUGUST 21, 1990
INVENTOR(S) : MEINDERT J. M. BEERLAGE

It is certified that error appears in the above-identified patent and that said Letters Patent is hereby corrected as shown below:

Column 6, line 6, "element,", should read -- elements, --.

Column 6, lines 31-39; claim 5, should read:

-- 5. Image pickup device according to claim 3 or 4 wherein each region includes a plurality of switching means for a certain image pickup element in said image pickup elements of a region of a column, a switching means in one position transferring charge from an associated image pickup element to a conduction channel and being a sole switching means in said one position during operation while another switching means is in another position. --

Signed and Sealed this

Tenth Day of March, 1992

Attest:

HARRY F. MANBECK, JR.

*Attesting Officer*  *Commissioner of Patents and Trademarks*